(12) United States Patent
Rapp et al.

(10) Patent No.: US 9,207,998 B2
(45) Date of Patent: Dec. 8, 2015

(54) COMPUTER-BASED SYSTEM MANAGEMENT BY A SEPARATE MANAGING SYSTEM

(75) Inventors: Roman Rapp, Villeneuve Loubet (FR); Helmut Fieres, Malsch (DE); Guenter Briam, Wiesloch (DE); Emmanuel Turci, Antibes (FR)

(73) Assignee: SAP SE, Walldorf (DE)

( * ) Notice: Subject to any disclaimer, the term of this patent is extended or adjusted under 35 U.S.C. 154(b) by 695 days.

(21) Appl. No.: 13/074,963

(22) Filed: Mar. 29, 2011

(65) Prior Publication Data

US 2012/0254869 A1 Oct. 4, 2012

(51) Int. Cl.
G06F 9/46 (2006.01)
G06F 9/54 (2006.01)

(52) U.S. Cl.
CPC ............ *G06F 9/54* (2013.01); *G06F 2209/541* (2013.01)

(58) Field of Classification Search
None
See application file for complete search history.

(56) References Cited

U.S. PATENT DOCUMENTS

| 5,793,982 | A  | * | 8/1998  | Shrader et al. ................ 709/232 |
| 2002/0147626 | A1 | * | 10/2002 | Zagotta et al. .................... 705/9 |
| 2006/0048159 | A1 | * | 3/2006  | Yazawa et al. ................ 718/104 |
| 2012/0198438 | A1 | * | 8/2012  | Auer ............................. 717/176 |

* cited by examiner

*Primary Examiner* — Mengyao Zhe
(74) *Attorney, Agent, or Firm* — Schwegman Lundberg & Woessner, P.A.

(57) ABSTRACT

In an embodiment, a method is presented for providing managerial access to a managed system. In this method, a definition of a procedure to be performed on the managed system is received into a managing system. A request to perform the procedure is received into the managing system from a user of the managing system. The procedure is performed in response to the request. The performing of the procedure includes initiating a plurality of functions resident in the managed system. Results indicative of the performing of the procedure are presented to the user of the managing system.

19 Claims, 4 Drawing Sheets

COMPUTER-BASED SYSTEM MANAGEMENT BY A SEPARATE MANAGING SYSTEM

FIELD

The present disclosure relates generally to management of computer-based systems. In an example embodiment, the disclosure relates to providing managerial access to a computer-based system from a separate managing system.

BACKGROUND

Computer-based systems, including the software being executed thereon, are oftentimes operated upon by two general classes of users: the primary users that interact with the system for at least one specific purpose, and the information technology (IT) or systems professionals (for example, systems administrators) that interact with the system to ensure its proper operation for the benefit of the primary users. For example, the primary user may be utilizing a business application on the system for marketing, sales, inventory, and/or other related business activities. For these same systems, the system administrators may be engaged in periodic system maintenance, data archiving, system reconfiguration, system testing, and other system management functions.

Previously, system problems often involved onsite participation of the provider of the system or associated software for problem resolution by way of a series of specialized commands or functions provided in, or added to, the system to be managed. Eventually, the provider was able to undertake many such tasks remotely, such as by way of an Internet or other network or remote communication connection. However, as the number of systems and software installations for a typical system or software provider continue to increase, the ability of a system or software vendor or supplier to continue to provide such services for all customers is diminished accordingly.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
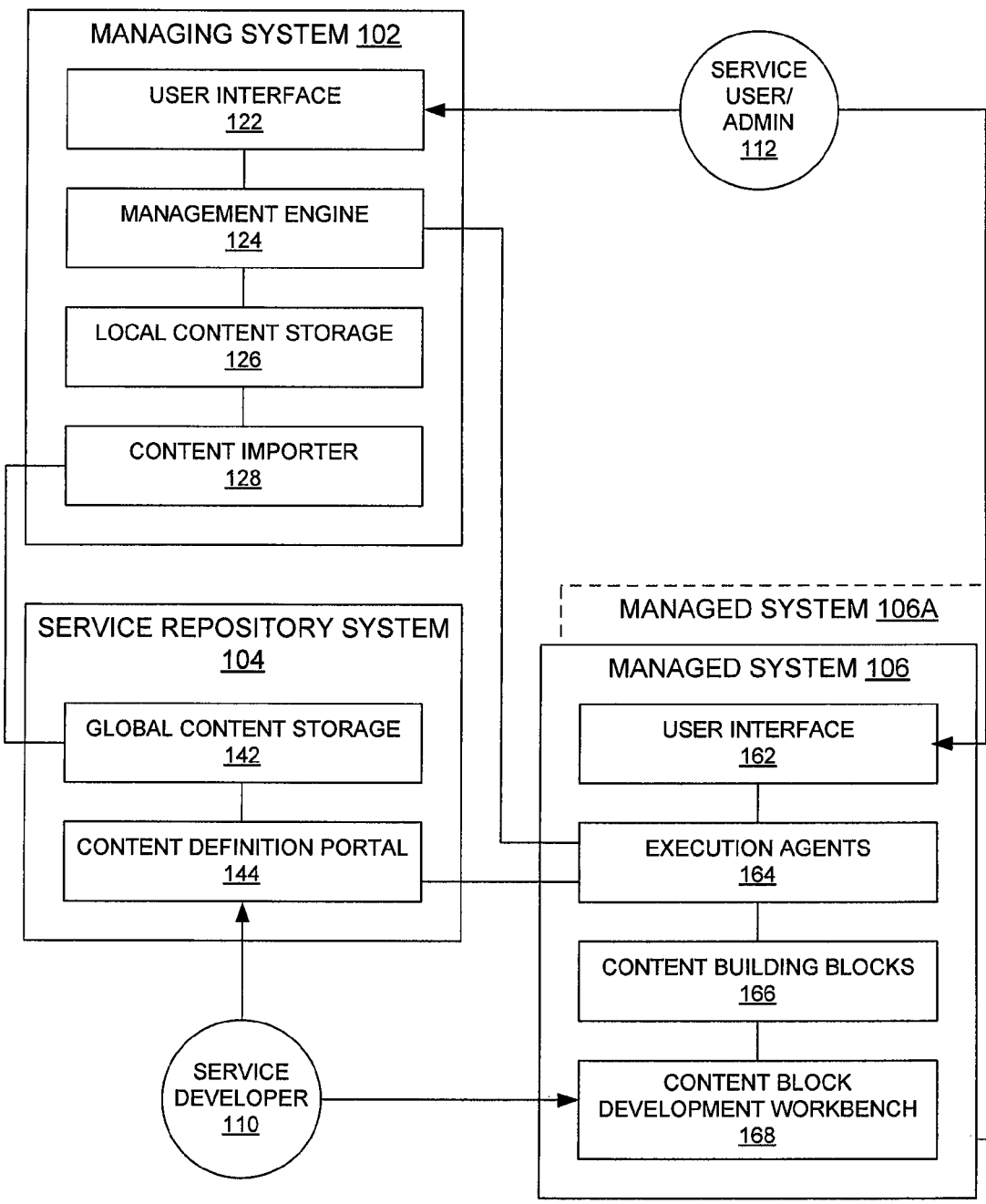
FIG. 1 is a block diagram depicting a managing system communicatively coupled with a managed system and a service repository system, consistent with an example embodiment, that is embodied in at least one computing device.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

In one example, a method for providing managerial access to a managed system is provided. In this method, a definition of a procedure to be performed on the managed system is received into a managing system. A request to perform the procedure is received into the managing system from a user of the managing system. The procedure is performed in response to the request. The performing of the procedure includes initiating a plurality of functions resident in the managed system. Results indicative of the performing of the procedure are presented to the user of the managing system.

In one example, a non-transitory machine-readable medium that stores instructions is provided. The instructions, when performed by a machine, cause the machine to perform operations. Such operations include receiving a definition of a procedure to be performed on a system to be managed by, and that is separate from, the managing system; receiving a request from a user of the managing system to perform the procedure; performing the procedure in response to the request, with the performing of the procedure including initiating a plurality of functions resident in the managed system; and presenting to the user results indicative of the performing of the procedure.

In one example, a computing device is provided. This computing device includes at least one processor and a memory in communication with the at least one processor. The memory is configured to store a system management module that is executable by the at least one processor. The system management module has instructions that when executed by the at least one processor, cause operations to be performed. Such operations include receiving a definition of a procedure to be performed on a system to be managed, wherein the managed system is separate from the computing device; receiving a request from a user of the computing device to perform the procedure; performing the procedure in response to the request, with the performing of the procedure including initiating a plurality of functions resident in the managed system; and presenting to the user of the computing device results indicative of the performing of the procedure.

In reference to the above embodiments, in one example, the definition of the procedure includes a text file, wherein the performing of the procedure includes interpreting the text file.

In another example, the performing of the procedure includes issuing a plurality of requests to the plurality of functions resident in the managing system.

In one example, at least one of the plurality of requests is initiated via a remote function call to one of an application programming interface and a user interface provided in the managed system. In another example, at least one of the plurality of functions returns to the managing system data requested via the at least one of the plurality of requests. In another example, at least one of the plurality of functions inserts into the managed system configuration data supplied via the at least one of the plurality of requests. In another example, at least one of the plurality of functions executes a task specified via the at least one of the plurality of requests.

In one example, the method or operations include receiving into the managing system directions from the user to alter the procedure to be performed on the managed system, wherein the performing of the procedure includes altering the procedure to be performed on the managed system according to the directions. In one example, the method or operations include, prior to the performing of the procedure, presenting a visual representation of the procedure to the user as a series of operational steps to be performed on the managing system, wherein the directions to alter the procedure includes directions to alter at least one of the operational steps of the procedure. In another example, at least one of the series of operational steps includes multiple activities, wherein the method or operations includes presenting to the user a status of at least one of the multiple activities.

In an example, the procedure may be a procedure to configure the managed system, a procedure to revise the managed system, a procedure to resolve a problem in the managed system and/or a procedure to manage data located in the managed system.

In an example, the procedure is generated via a development interface provided on the managed system and transferred to the managing system. In another example, the generating of the procedure does not require a corresponding change to the managed system or to the managing system.

Description of Embodiments

The embodiments described herein provide various techniques for providing managerial access to a managed system. In one example, a definition of a procedure is received into a managing system. In response a request from a user of the managing system to perform the procedure, the managing system may perform the procedure by initiating a plurality of functions resident in the managed system. In at least some examples, by providing a separate managing system, operational control of the managed system may be updated or revised without changing the underlying software or other characteristics of the managed system. Other aspects of the embodiments discussed herein may be ascertained from the following detailed description.

FIG. 1 is block diagram depicting a managing system 102 communicatively coupled with a managed system 106 and a service repository system 104, consistent with one example embodiment. In one example, each of the systems 102, 104, 106 may be software systems or modules executing on separate computer systems. In another example, the managing system 102 may operate on the same computer system as the managed system 106, while the service repository system 104 resides on a separate computer system in a remote location. In yet other implementations, one or more of the systems 102, 104, 106 may be distributed among multiple computer components or systems, or may all be incorporated into a single computer system. In some implementations, the managing system 102 may be communicatively coupled with multiple managed systems 106, such as the managed system 106 and a second managed system 106A depicted in FIG. 1, which may reside on one or more computer systems, thus facilitating operational control of the managed systems 106, 106A by the managing system 102. In general, the embodiments described herein are not limited to any particular computer system configuration.

In the example of FIG. 1, the managing system 102 includes a user interface 122, a management engine 124, local content storage 126, and a content importer 128. One or more of these components 122, 124, 126, 128 may be considered collectively as a system management module or system. In one example, the user interface 122 provides any number of procedures, or "scenarios," to exert managerial control over the managed system 106. Examples of these procedures include, but are not limited to, system configuration and customization, system problem resolution, and planned periodic tasks, such as periodic system checking and revision, and data management functions, such as data backup and restoration, and data archival. Further, some procedures may be performed on all managed systems 106, 106A while others may be generated for a specific managed system 106, or for managed systems 106, 106A operated by a particular customer or group of customers. The user interface 122 may be provided for the benefit of a service user or system administrator 112, who may be generally involved in, or responsible for, managerial control and maintenance of the managed system 106. An example of a graphical user interface, as presented to the user 112 via the user interface 122, is provided in FIG. 4 and described in greater detail below.

The management engine 124 of the managing system 102 executes the procedures requested to be performed by the user 112. In one example, the procedure may be performed with interaction by the user 112, or may be performed more automatically at some predetermined time at the choosing of the user 112. As is described more fully below in conjunction with FIG. 4, the user 112 may provide additional user input to direct or otherwise affect the execution of the procedures.

In one example, each of the procedures to be performed may be specified or defined by way of one or more text files, such as an Extensible Modeling Language (XML) file. Use of such a file may enhance the ability of a service developer 110 (depicted in FIG. 1) to generate a number of procedures quickly, as well as simplify the execution of the procedures by the management engine 124, due to the use of a single documentation standard for each of the procedures. Following such a standard may also reduce the frequency of revision or upgrading of the management engine 124 or the content building blocks 166 in the managed system 106, especially when compared to the rate at which the procedures may be generated and deployed. Also, use of XML or other text or script file formats allows the management engine 124 to interpret the procedure as part of its execution without compiling or other significant pre-execution operations. However, other data formats aside from text data formats may be employed for the definitions of the procedures in other embodiments.

In the example of FIG. 1, the local content storage 126 stores the procedures that may be performed. In various embodiments, the local content storage 126 may include or be coupled with any volatile or non-volatile data storage device or system capable of storing the procedures, which the management engine 124 may retrieve from the local content storage 126 for execution. Volatile data storage devices may include, for example, static and dynamic random-access memory (RAM), while non-volatile storage devices may include, but are not limited to, flash memory, magnetic disk memory, and optical disk memory.

The content importer 128 retrieves the procedures from the service repository system 104 (described in greater detail below) and stores the procedures in the local content storage 126. In an example, the content importer 128 may include, or be associated with, a network interface, such as an interface for a local-area network (LAN), or for a wide-area network (WAN) (for example, the Internet), over which the procedures may be received from the service repository system 104. In one implementation, the content importer 128 may, from time to time, poll the service repository system 104 for procedures that may be performed on the managed system 106 coupled with the managing system 102. In some examples, the service repository system 104 may initiate a transfer to the managing system 102 of those procedures that are applicable to the managed system 106, or may transfer some indication to the managing system 102 that such a procedure is available for download into the local content storage 126.

As depicted in FIG. 1, the service repository system 104 includes global content storage 142 and a content definition portal 144. In an embodiment, the global content storage 142 may contain procedures (for example, data files defining the procedures) for multiple managing systems 102, each of which may operationally control one or more managed systems 106 involving any number of system customers or installations. In an implementation, the global content storage 142, which may include or be associated with one or more data storage devices or systems, may incorporate means by which the service repository system 104 may control which procedures are accessible by each managing system 102. In some examples, at least some of the procedures may be available to all managing systems 102.

In one example, by providing the procedures remotely from the service repository system 104, a software or system vendor, or a partner thereof, may provide remote access to multiple procedures or scenarios to a multitude of customers employing the managed systems 106 and managing systems 102. Such embodiments thus allow the vendor or partner to empower the user or administrator 112 of the customer to perform tasks or operations involving the managed system 106 that previously involved either onsite or contemporaneous remote participation of the vendor or partner. Moreover, by providing the procedures to the managing system 102, and hence the user 112, the user 112 may then learn from the procedures, or leverage the information provided therein, to generate new procedures that are not received from the service repository system 104.

In the service repository system 104, the content definition portal 144 provides an interface through which a service developer 110 may transfer, and possibly generate, the procedures to be stored in the global content storage 142. In one example, the content definition portal 144 provides a communication path through which previously generated procedures may be provided as input to the service repository system 104 for storage in the global content storage 142. In another example, the content definition portal 144 provides a type of user interface for the service developer 110 to generate and test procedures using either the intended target managed system 106 or a managed system 106 utilized by the service developer 110 primarily for testing purposes.

The system 106 to be managed by the managing system 102 may be any computer system and associated software provided for any business or technical user. Examples of the managed system 106 include, but are not limited to, database access and management systems, enterprise resource planning (ERP) systems, marketing systems, sales systems, manufacturing and/or testing systems, engineering design and/or development systems, scientific research systems, financial systems, and e-mail and other communications systems.

In the example of FIG. 1, the managed system 106 includes a user interface 162 for a primary user (not illustrated in FIG. 1) to access and use the operational aspects of the managed system 106. For example, if the managed system 106 is a financial system, the primary user may employ the user interface 162 to generate and review financial reports of previous time periods, generate financial forecasts of upcoming time periods, and the like. The service user/administrator 112 may also employ the user interface 162 for any number of purposes, including, for example, testing the managed system 106 from the perspective of a primary user after a procedure has been executed from the managing system 102.

Communicatively coupled to the user interface 162 of the managed system may be one or more execution agents 164. In an embodiment, the execution agents 164 receive requests to execute various operations or tasks, which the execution agents 164 perform using one or more content building blocks 166 stored on, or accessible by, the managed system 106. In one example, the execution agents 164 may receive these requests by way of function calls, request messages, or other methods of communication from the user interface 162 to, for example, change data stored in the managed system 106. The execution agents 164 may also return any results generated by the operations or tasks to the user interface 162 for presentation to the user.

In other examples, the execution agents 164 may execute tasks and operations requested by the management engine 124 of the managing system 102 in the performance of one or more procedures selected by the service user/administrator 112, as well as return to the management engine 124 any data or responses resulting from the execution of the tasks or operations. In some examples, the execution agents 164 provide the same or similar functionality in response to communications received from content definition portal 144 of the service repository 104. For example, in generating or testing a procedure, the service developer 110 may employ the content definition portal 144 to send requests to the execution agents 164 to execute one or more desired tasks or operations in the managed system 106. As mentioned above, these requests may take the form of remote function calls, remote procedure calls, requests for web services, request messages, or other methods of communication between the managing system 102, the service repository system 104, and the managed system 106. In another embodiment, each of the execution agents 164 may be accessible via the user interface 162, the management engine 124, or both.

In an embodiment, execution agents 164 operate by exposing to the content definition portal 144 and the management engine 124 interfaces defined by the content building blocks 166. The content building blocks 166 may be, for example, software modules that perform specific tasks or operations as defined by an application programming interface (API) or user interface (UI) presented by the content blocks 166.

The APIs and/or UIs provided by the content building blocks 166 may allow the management engine 124 and the content definition portal 144 to initiate any function, task, or operation defined by the APIs and/or UIs. In one embodiment, the management engine 124 and the content definition portal 144 may issue one or more remote calls to an API or UI provided by one of the content building blocks 166 to initiate a function. One example of such a function may be a function to retrieve and return specific data maintained within the managed system 106, such as a data table size or specific entries of a data table. Another example may be a function to receive configuration data from the management engine 124 or the content definition portal 144, and insert the configuration data into an appropriate table or other data structure of the managed system 106. Yet another example of a function provided by a content building block 166 may be a function that manually executes one or more tasks. These functions may be employed in the management engine 124 of the managing system 102 to perform a particular procedure on the managed system 106 for maintenance, problem resolution, and other purposes.

To facilitate the generation of the content building blocks 166 and associated APIs and/or UIs, the managed system may provide a content block development "workbench" 168 or interface that provides the service developer 110 with one or more facilities or tools for generating and checking the building blocks 166, possibly under a single, unified interface or platform. Examples of such facilities may include, but are not limited to, tools providing software modeling and analysis, and API and/or UI development, as well as code generation, verification, and maintenance. In one example, the development workbench 168 may be provided on a managed system 106 under the control of the service developer 110, such as a managed system 106 maintained by a system vendor or partner. In another example, the developer of the application may generate content building blocks 166 that the service developer 110 may use, thus allowing the application developer to provide such content without modifying the managed system 106. In this case, the development workbench 168 may allow the service developer 110 to discover and access content building blocks 166 in the managed system 106 so that the service developer 110 need not generate the content building blocks 166 in addition to the procedures or scenarios to be executed.

In at least some embodiments, by separating or componentizing the functions of the managing system 102 from the managed system 106, as described above, various services, such as system configuration, problem resolution, system maintenance, and the like, may be delivered to the administrator 112 or customer more frequently than what may be otherwise expected if such functionality were integrated or "hard-coded" within the content building blocks 166 of the managed system 106. Further, by providing the functionality of the procedures to be performed separately from the modules of the managing system 102, neither the managing system 102 nor the managed system 106 need be modified in a corresponding manner to generate a wide range of procedures or scenarios in most cases.

Figure 2:
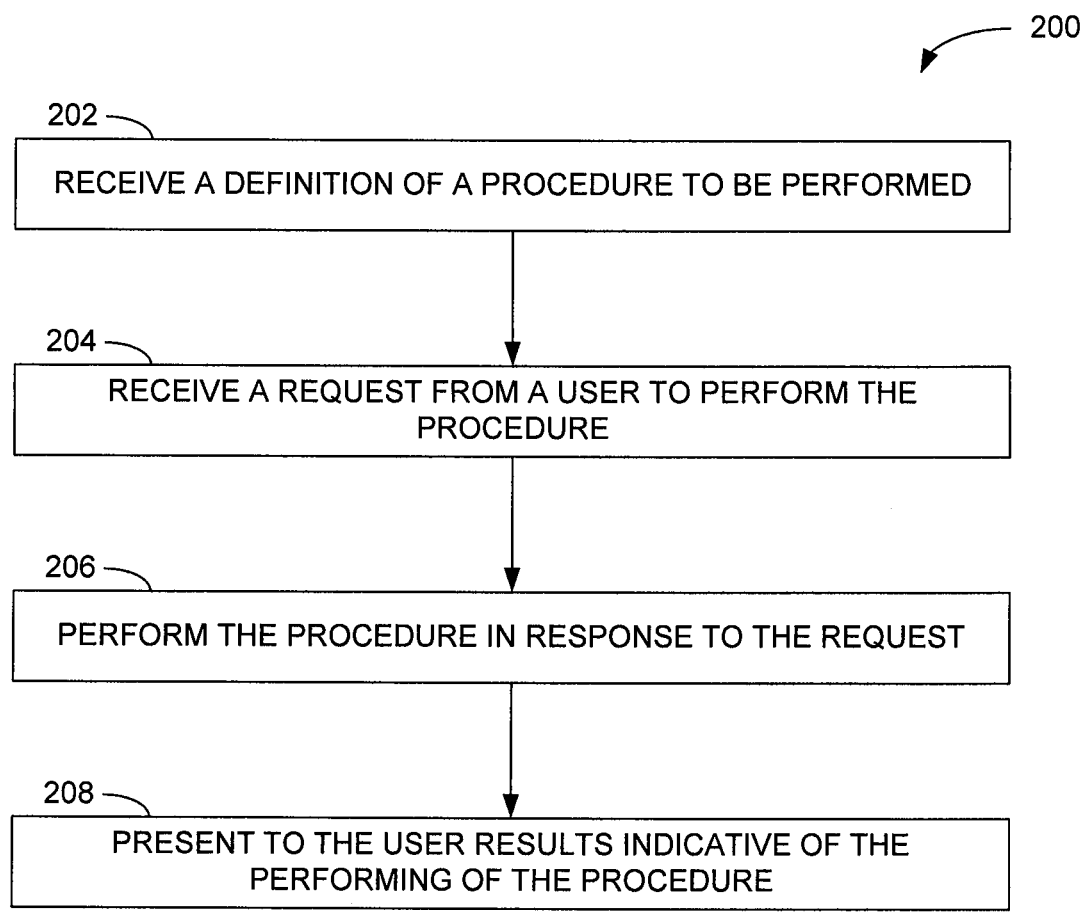
FIG. 2 is a flow diagram of a general overview of a method, in accordance with one example embodiment, for providing operational access to a managed system.

FIG. 2 depicts a flow diagram of a general overview of a method 200, in accordance with an example embodiment, for providing managerial access to a managed system, such as the managed system 106 of FIG. 1. In an example embodiment, the method 200 may be implemented by the managing system 102 depicted in FIG. 1. In the method 200, a definition of a procedure to be performed on the managed system is received (operation 202). In one example, the procedure may be received into the managing system 102 of FIG. 1 via the content importer 128. A request to perform the procedure is received from a user, such as the service user/administrator 112 of FIG. 1 (operation 204). In the embodiment of FIG. 1, the request may be received via the user interface 122 of the managing system 102. The procedure is performed in response to the request (operation 206). In the embodiment of FIG. 1, the management engine 124 of the managing system 102 may perform the procedure by way of remote calls to the content building blocks 166 of the managed system 106 via the execution agents 164. Results indicative of the execution of the procedure may then be presented to the user (operation 208), such as by way of the user interface 122 of the managing system 102 of FIG. 1. Other implementations and aspects regarding the direction and performance of the procedure are provided below in reference to FIG. 3.

Figure 3:
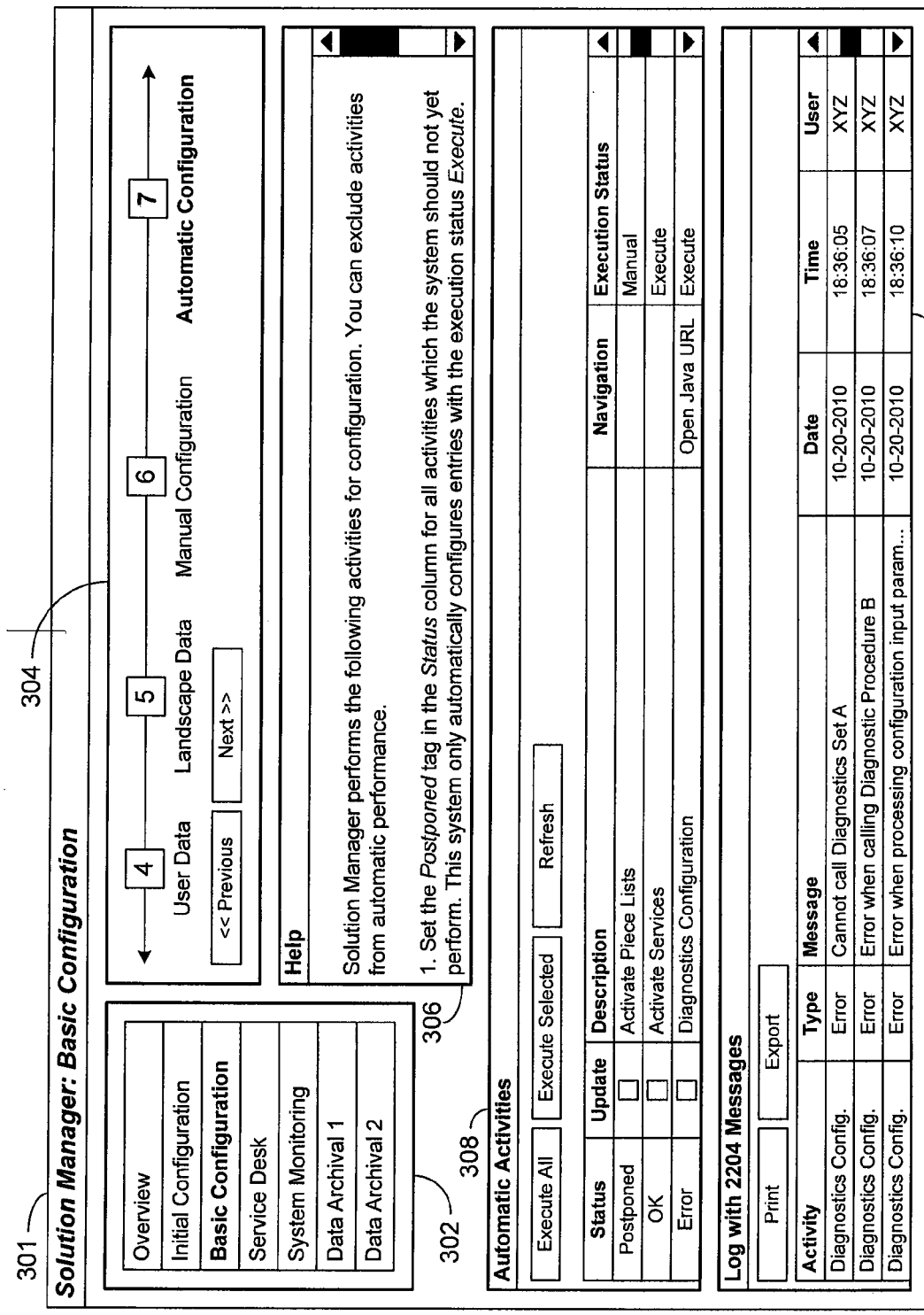
FIG. 3 is a visual representation of a graphical user interface associated with a managing system, consistent with an example embodiment.

FIG. 3 is a visual representation of a graphical user interface (GUI) 300 consistent with an example embodiment. In reference to FIG. 1, the GUI 300 may be presented to the service user/administrator 112 via the user interface 122 of the managing system 102. While the discussion below concentrates specifically on the GUI 300 of FIG. 3, other types and forms of user interface may be provided to the user 112 in other examples.

As shown, the GUI 300 presents a navigation menu 302 listing a number of procedures or scenarios that the user 112 may perform on a managed system 106. As mentioned above, each procedure may provide some service, such as system configuration, system maintenance, data archival, system monitoring, problem resolution, and the like. In the particular example of FIG. 3, the user 112 has selected the procedure "Basic Configuration," which is highlighted in the navigation menu 302. Also, in this example, a title bar 301 displaying a name ("Solution Manager") associated with the GUI 300 includes the name of the selected procedure. In one example, the procedures may be grouped into categories, with the categories being displayed in the navigation menu 302, so that when a user selects a category, a list of the procedures included in that category may then be displayed.

Also included in the GUI 300 is a roadmap window 304 displaying an ordered series of operational steps to be executed or performed in the procedure. As shown in FIG. 3, the Basic Configuration procedure includes at least seven steps, such as "User Data" (Step 4), "Landscape Data" (Step 5), "Manual Configuration" (Step 6), and "Automatic Configuration" (Step 7). The roadmap window 304 also provides a "previous" button and a "next" button to allow the user 112 to navigate, and possibly alter, the steps of the procedure. The roadmap window 304 thus guides the user 112 through the steps of the selected procedure, as was intended by the service developer 110.

The GUI 300 also provides a help window 306 that may provide the user 112 with information regarding the procedure (in the example of FIG. 3, the Basic Configuration procedure). The help window 306 may present, for example, information concerning the expected results of the procedure, the various steps to be performed by the procedure, and the ways in which the user may alter the procedure or its constituent steps. Additional or different information may be provided in the help window 306 in other embodiments.

Also shown in FIG. 3 is an activities window 308 of the GUI 300. The activities window 308 may list a number of "activities" or functions that constitute a particular operational step of the procedure (in the example of FIG. 3, the "Automatic Configuration" step). In some examples, the user 112 may designate some of the activities as "postponed" in the "Status" column of the activities window 308 to postpone execution of those activities until a later time. This functionality may be restricted to some subset of the activities by the procedure definition. The Status column may also provide a status of the corresponding activity, such as, for example, "Postponed," "OK," "Warning," "Success," "Information," and "Error." In an example, some activities may be executed selectively by way of selecting specific activities, such as by way of the "Update" column, and then selecting the "Execute Selected" button presented in the activities window 308. As illustrated in FIG. 3, the activities window 308 may provide additional information in reference to each activity, such as a description of the activity, navigation information associated with the activity, and an execution status (for example, "Manual" or "Execute") of the activity. The status of each of the activities as shown in the activities window 308 may also be renewed via a "Refresh" button available to the user 112.

To present results generated from the execution of the procedure, the GUI 300 may also provide a log window 310. As depicted in FIG. 3, the log window 310 may present or display a number of messages generated by the managing system 102 in tabular form, along with an identity of the activity being performed at the time of the message, the type of message (for example, an "error" message), a date and time at which the message was generated, and a user associated with the activity. While error messages are illustrated exclusively in FIG. 3, other types of messages, such as warnings or success indications, may be provided in other examples. In addition, the messages presented may include messages originally generated by the managed system 106 or another system within the scope of the procedure being executed.

The GUI 300 depicted in FIG. 3, as described above, as well as the managing system 102 presenting the GUI 300, may thus provide the service user/administrator 112 with the ability to execute procedures that previously would have been executed under the direct control of a service developer 110 or other representative of a vendor or partner associated with managed system 106. As a result, the user/administrator 112 may perform such procedures in a timely manner, while the service developer 110 is able to provide his services indirectly to a greater number of customers than what was previously possible.

Figure 4:
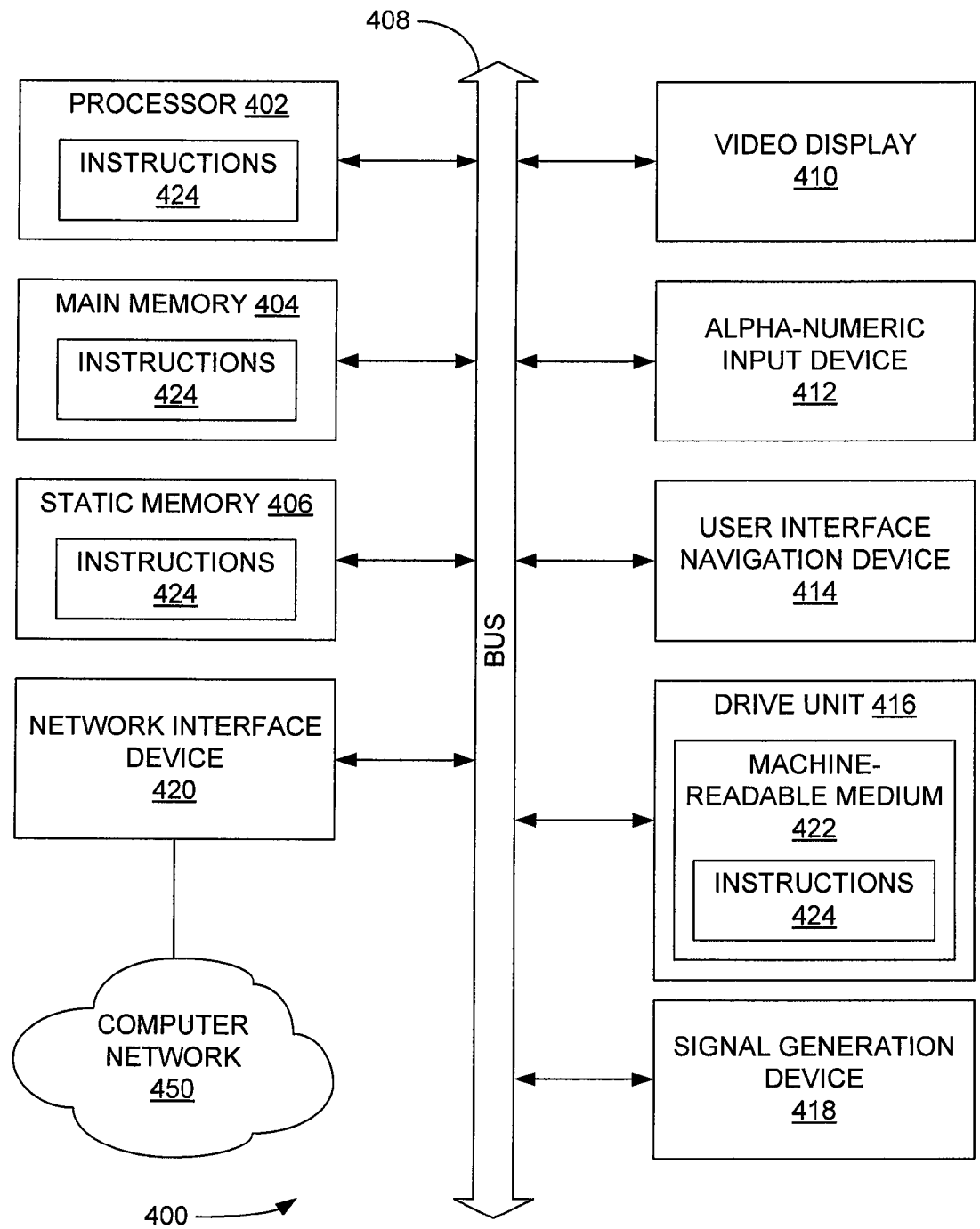
FIG. 4 depicts a block diagram of a machine in the example form of a processing system within which may be executed a set of instructions for causing the machine to perform any one or more of the methodologies discussed herein.

FIG. 4 depicts a block diagram of a machine in the example form of a processing system 400 within which may be executed a set of instructions for causing the machine to perform any one or more of the methodologies discussed herein. In alternative embodiments, the machine operates as a standalone device or may be connected (for example, networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 400 includes a processor 402 (for example, a central processing unit (CPU), a graphics processing unit (GPU), or both), a main memory 404 (for example, random access memory), and static memory 406 (for example, static random-access memory), which communicate with each other via bus 408. The processing system 400 may further include video display unit 410 (for example, a plasma display, a liquid crystal display (LCD), or a cathode ray tube (CRT)). The processing system 400 also includes an alphanumeric input device 412 (for example, a keyboard), a user interface (UI) navigation device 414 (for example, a mouse), a disk drive unit 416, a signal generation device 418 (for example, a speaker), and a network interface device 420.

The disk drive unit 416 (a type of non-volatile memory storage) includes a machine-readable medium 422 on which is stored one or more sets of data structures and instructions 424 (for example, software) embodying or utilized by any one or more of the methodologies or functions described herein. The data structures and instructions 424 may also reside, completely or at least partially, within the main memory 404, the static memory 406, and/or within the processor 402 during execution thereof by processing system 400, with the main memory 404 and processor 402 also constituting machine-readable, tangible media.

The data structures and instructions 424 may further be transmitted or received over a computer network 450 via network interface device 420 utilizing any one of a number of well-known transfer protocols (for example, HyperText Transfer Protocol (HTTP)).

Certain embodiments are described herein as including logic or a number of components, modules, or mechanisms. Modules may constitute either software modules (for example, code embodied on a machine-readable medium or in a transmission signal) or hardware modules. A hardware module is a tangible unit capable of performing certain operations and may be configured or arranged in a certain manner. In example embodiments, one or more computer systems (for example, the processing system 400) or one or more hardware modules of a computer system (for example, a processor 402 or a group of processors) may be configured by software (for example, an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 402 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (for example, hardwired) or temporarily configured (for example, programmed) to operate in a certain manner and/or to perform certain operations described herein. Considering embodiments in which hardware modules are temporarily configured (for example, programmed), each of the hardware modules need not be configured or instantiated at any one instance in time. For example, where the hardware modules include a general-purpose processor 402 that is configured using software, the general-purpose processor 402 may be configured as respective different hardware modules at different times. Software may accordingly configure a processor 402, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 402 that are temporarily configured (for example, by software) or permanently configured to perform the relevant operations. Whether temporarily or permanently configured, such processors 402 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 402 or processor-implemented modules. The performance of certain of the operations may be distributed among the one or more processors 402, not only residing within a single machine but deployed across a number of machines. In some example embodiments, the processors 402 may be located in a single location (for example, within a home environment, within an office environment, or as a server farm), while in other embodiments, the processors 402 may be distributed across a number of locations.

While the embodiments are described with reference to various implementations and exploitations, it will be understood that these embodiments are illustrative and that the scope of claims provided below is not limited to the embodiments described herein. In general, techniques for providing managerial access to a managed system may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of providing managerial access to a managed system, the method comprising:
   receiving, from a service repository system, into a managing system a definition of a procedure to be performed on the managed system, wherein the managing system is distinct from the managed system and wherein the managing system includes a graphical user interface for presenting data to a first user, wherein the definition of a procedure is stored in a global content storage of the service repository system and the service repository controls which procedures are accessible by the managing system;
   receiving into the managing system directions from a second user to alter the received procedure to be performed on the managed system;
   altering the received procedure in accordance with the received directions from the second user to define an altered procedure;
   receiving into the managing system a procedure execution request;
   in response to the procedure execution request:
      presenting a graphical representation of the altered procedure to the first user in the graphical user interface of the managing system as a series of operational steps to be performed on the managing system, wherein the directions to alter the procedure comprise directions to alter at least one of the operational steps of the received procedure; and
      performing, using a processor of the managing system, the altered procedure, the performing of the altered procedure comprising initiating a plurality of functions for execution by execution agents resident in the managed system;
      returning results of performing the altered procedure, by the execution agents, to be presented to the first user of the managing system;
      receiving by the execution agents, from a content definition portal on the service repository system, task execution request from a third user to be executed on the managed system; and
      executing the task by the execution agents.

2. The method of claim 1, wherein the definition of the altered procedure comprises a text file, and wherein the performing of the altered procedure comprises interpreting the text file.

3. The method of claim 1, wherein the performing of the altered procedure comprises issuing a plurality of requests to the plurality of functions resident in the managed system.

4. The method of claim 3, wherein at least one of the plurality of requests is issued to an application programming interface provided in the managed system, and wherein at least one of the plurality of functions returns to the managing system data requested via the at least one of the plurality of requests.

5. The method of claim 3, wherein at least one of the plurality of requests is issued to an application programming interface provided in the managed system, and wherein at least one of the plurality of functions inserts into the managed system configuration data supplied via the at least one of the plurality of requests.

6. The method of claim 3, wherein at least one of the plurality of requests is issued to a user interface provided in the managed system, and wherein at least one of the plurality of functions executes a task specified via the at least one of the plurality of requests.

7. The method of claim 1, wherein at least one of the series of operational steps comprises multiple activities, and wherein the method comprises presenting to the first user a status of at least one of the multiple activities.

8. The method of claim 1, wherein the received procedure comprises a procedure to configure the managed system.

9. The method of claim 1, wherein the received procedure comprises a procedure to revise the managed system.

10. The method of claim 1, wherein the received procedure comprises a procedure to manage data located in the managed system.

11. The method of claim 1, further comprising:
    generating the received procedure via a development interface provided on the managed system; and
    transferring the received procedure to the managing system.

12. The method of claim 1, wherein the generating of the received procedure does not require a corresponding change to the managed system or to the managing system.

13. A non-transitory machine-readable medium that stores instructions for a managing system, which, when performed by a machine, cause the machine to perform operations comprising:
    receiving, from a service repository system, into a managing system a definition of a procedure to be performed on the managed system, wherein the managing system is distinct from the managed system and wherein the managing system includes a graphical user interface for representing data to a first user, wherein the definition of a procedure is stored in a global content storage of the service repository system and the service repository controls which procedures are accessible by the managing system;

receiving into the managing system directions from second user to alter the received procedure to be performed on the managed system;

altering the received procedure in accordance with the received directions from the second user to define an altered procedure;

receiving a procedure execution request into the managing system;

in response to the procedure execution request:

presenting a graphical representation of the altered procedure to the first user in the graphical user interface of the managing system as a series of operational steps to be performed on the managing system, wherein the directions to alter the procedure comprise directions to alter at least one of the operational steps of the received procedure; and performing, using a processor of the managing system, the altered procedure, the performing of the altered procedure comprising initiating a plurality of functions for execution by execution agents resident in the managed system;

returning results of performing the altered procedure, by the execution agents, to be presented to the first user of the managing system;

receiving by the execution agents, from a content definition portal on the service repository system, task execution request from a third user to be executed on the managed system; and executing the task by the execution agents.

14. The non-transitory machine-readable medium of claim 13, wherein the performing of the altered procedure comprises initiating a plurality of requests to the plurality of functions resident in the managed system.

15. A computing device comprising:

at least one processor; and a memory in communication with the at least one processor, the memory being configured to store a system management module that is executable by the at least one processor, the system management module having instructions that, when executed by the at least one processor, cause operations to be performed, the operations comprising:

receiving, from a service repository system, into a managing system a definition of a procedure to be performed on the managed system, wherein the managing system is distinct from the managed system and wherein the managing system includes a graphical user interface for representing data to a first user, wherein the definition of a procedure is stored in a global content storage of the service repository system and the service repository controls which procedures are accessible by the managing system;

receiving into the managing system directions from a second user to alter the received procedure to be performed on the managed system;

altering the received procedure in accordance with the received directions from the second user to define an altered procedure;

receiving a procedure execution request into the managing system;

in response to the procedure execution request:

presenting a graphical representation of the altered procedure to the user in the graphical user interface of the managing system as a series of operational steps to be performed on the managing system, wherein the directions to alter the procedure comprise directions to alter at least one of the operational steps of the received procedure; and performing, using a processor of the managing system, the altered procedure, the performing of the altered procedure comprising initiating a plurality of functions for execution by execution agents resident in the managed system;

returning results of performing the altered procedure, by the execution agents, to be presented to the first user of the managing system;

receiving by the execution agents, form a content definition portal on the service repository system, task execution request from a third user to be executed on the managed system; and executing the task by the execution agents.

16. The computing device of claim 15, wherein the definition of the altered procedure comprises a text file, and wherein the performing of the altered procedure comprises interpreting the text file.

17. The computing device of claim 15, wherein the performing of the altered procedure comprises initiating a plurality of requests to the plurality of functions resident in the managed system.

18. The computing device of claim 17, wherein at least one of the plurality of requests comprises a request to one of an application programming interface and a user interface provided in the managed system.

19. The method of claim 1, wherein the first user and the second user are the same user.

* * * * *